(12) United States Patent
Simonazzi

(10) Patent No.: US 6,521,836 B1
(45) Date of Patent: Feb. 18, 2003

(54) CONTINUITY DEVICE FOR ELECTRIC CABLES

(75) Inventor: Giuseppe Simonazzi, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 0 days.

(21) Appl. No.: 09/974,647

(22) Filed: Oct. 9, 2001

(30) Foreign Application Priority Data

Oct. 18, 2000 (IT) .......................................... RE200034 U

(51) Int. Cl.$^7$ ............................................... H02G 11/00
(52) U.S. Cl. ...................................... 174/74 A; 439/502
(58) Field of Search ............................... 174/74 A, 135, 174/139, 50; 439/502, 540.1, 638

(56) References Cited

U.S. PATENT DOCUMENTS

| 4,588,187 | A | * | 5/1986 | Dell ........................ 273/148 B |
| 5,153,383 | A | * | 10/1992 | Whited et al. .............. 174/135 |
| 6,034,328 | A | * | 3/2000 | Kjerrumgaard ........... 174/74 R |
| 6,321,340 | B1 | * | 11/2001 | Shin et al. .................. 439/131 |

* cited by examiner

Primary Examiner—Chau N. Nguyen
(74) Attorney, Agent, or Firm—Abelman, Frayne & Schwab

(57) ABSTRACT

A continuity device for electric cables includes a container (6) having an upper surface (21) provided with current taps (20) located on the upper surface (21); and an arranging device (1) for gathering and containing the excess lengths of the electric feeding cables (7) positioned and tied above the upper surface (21); the electric feeding cables (7) being provided at the free end with plugs (9') that can be inserted in the current taps (20).

10 Claims, 2 Drawing Sheets

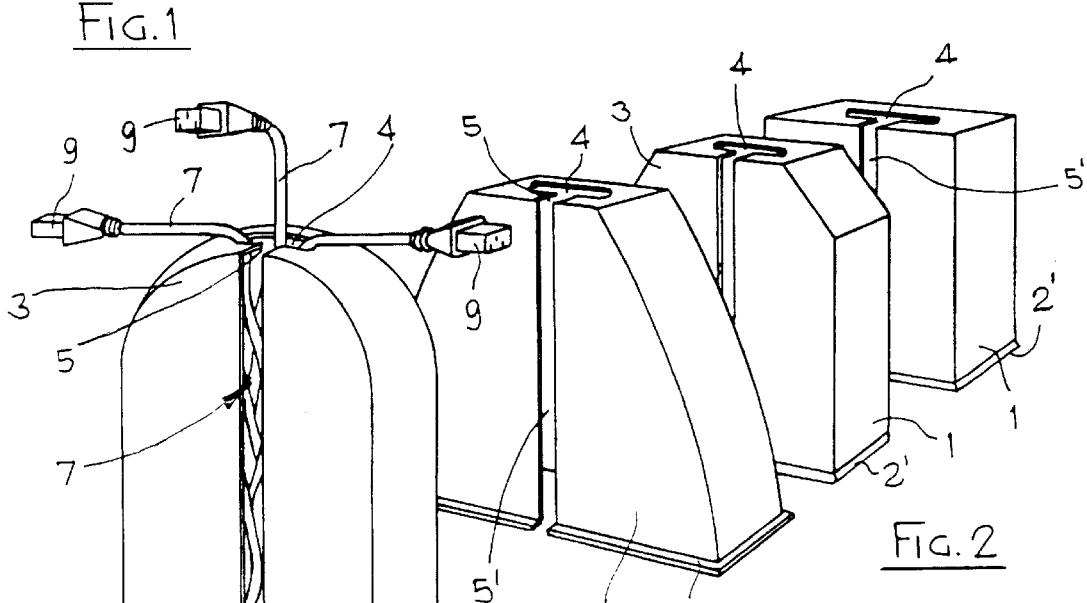
Fig. 1
Fig. 2
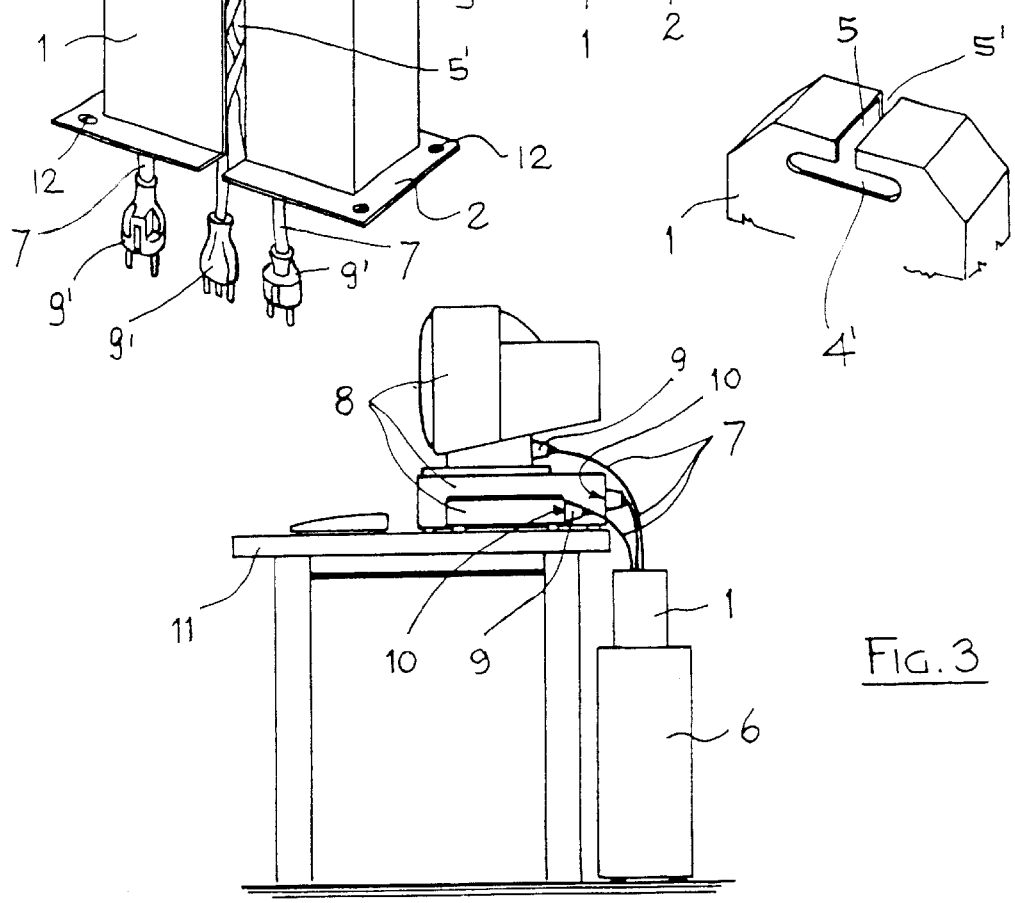
Fig. 3

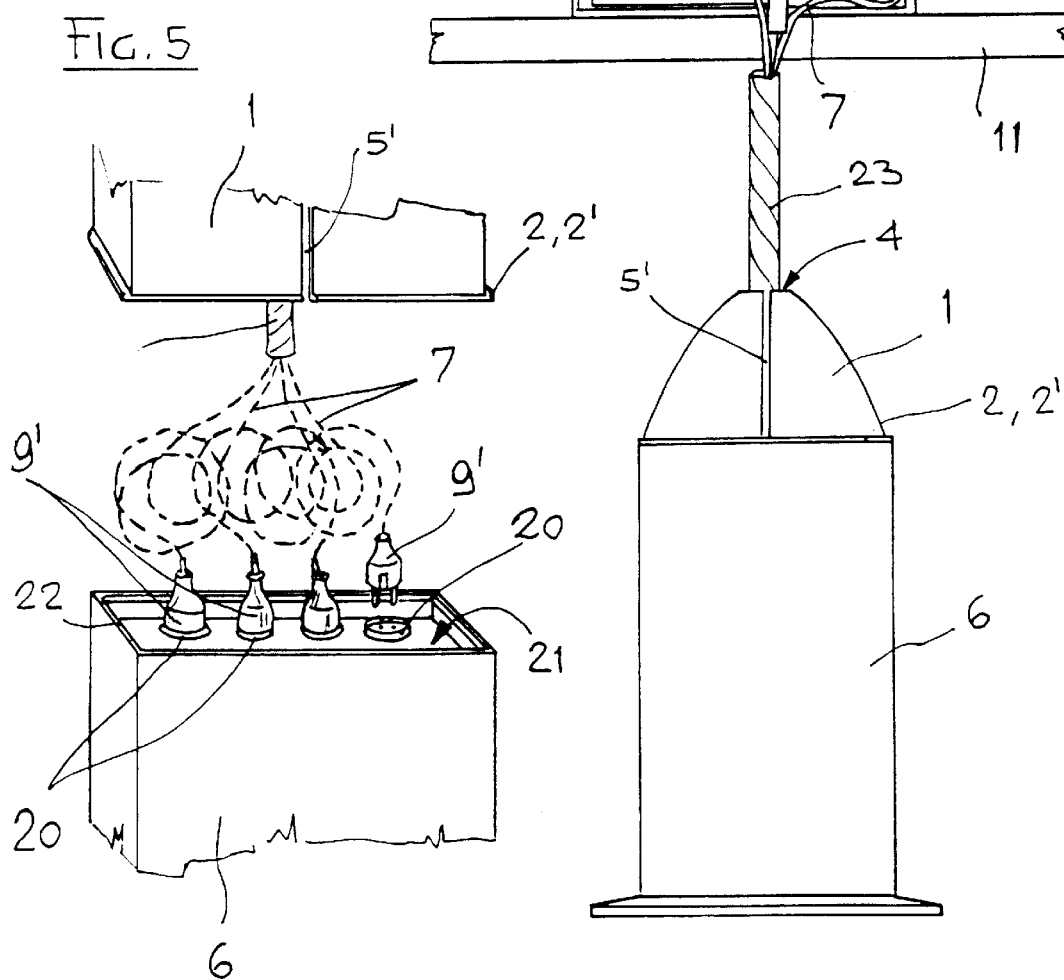

CONTINUITY DEVICE FOR ELECTRIC CABLES

BACKGROUND OF THE INVENTION

1. Field of the Invention

The present invention relates to an uninterruptible power supply (UPS) for electric cables. More particularly, the present invention relates to a continuity device for electric cables, provided with current taps, particularly suitable for computer systems in general.

2. Prior Art

As is known, in setting up computer operating systems in general, it is always rather difficult to realize a sufficiently rational arrangement for the feeding and interconnecting cables of the various components such as central computing units, monitors, printers, scanners and/or other peripheral working units. Usually, said cables, which are very different as concerns type, length and shape, are either kept loose in the rear zone of the supporting desk, behind the aforesaid apparatuses or, at best, they are gathered in some way, associated with each other by means of strings, twisted with each other, caused to slide as far as possible within more or less easily usable and effective raceways or guides.

However, such arrangements are not rational at all and may cause various accidents and/or malfunctions due to false contacts or plug detachments, with the ensuing possibility of blocks of the operating computer systems.

SUMMARY OF THE INVENTION

Object of the present invention is to remove the above drawbacks.

More particularly, object of the present invention is to provide a continuity device that allows to organize in a safe and rational manner all the electric connections, drastically reducing possible malfunction risks, false contacts and accidental detachment of the plugs, preventing thereby any possible blocks of computer systems.

According to the present invention, these and still other objects, which will be clarified by the following description, are achieved by means of a continuity device for electric cables comprising:

- a container having an upper surface and provided with current taps arranged on said upper surface and connected to a current generator; and
- a device for the gathering and containment of the excess lengths of electric feeding cables, positioned and fastened on said upper surface;
- said electric feeding cables being provided at the free end with plugs that can be inserted in said current taps.

The continuity device may have any form and size, provided it can contain the intermediate coils or spirals of the excess lengths of electric cables.

Preferably, the continuity device is an envelope comprising a fixing base and a dome. The dome is provided with a slit-like cut that extends from said opening, transversally relatively to the dome and vertically throughout the extension of the envelope wall.

The advantages achieved by the continuity device for electric cables of the present invention are numerous and evident. The feeding taps of the continuity device are all arranged on the upper surface of the container and therefore the access to, and use of, the same is easy.

The continuity device for electric cable is located above the upper surface of the container and therefore above the taps for the uninterruptible power supply (UPS) device.

The excess lengths of the feeding cables that connect the UPS unit to the central computer units, the monitors, the printers and/or the peripheral units, is gathered in the inside of the continuity device, where they are protected, they do not encumber, and cause all the connections to be more rational.

The length of the exposed cable is the one strictly necessary for the rational connection of the plugs to the related taps.

The constructive and functional characteristics of the continuity device for electric cables of the present invention will be better understood thanks to the following description, wherein reference is made to the attached drawings which represent some embodiments solely reported by way of non limiting example, and wherein:

FIG. 1 shows the perspective view of a first example of an arranging device for electric cables according to the invention, FIG. 2 shows the perspective view of some other embodiments of the arranging device for electric cables according to the invention, FIG. 3 shows the schematic side view of a UPS unit with an upper arranging device for electric cables, associated to a supporting desk for a computer system, FIG. 4 shows the schematic rear view of a UPS unit with an upper arranging device for electric cables, associated to the supporting desk for a different computer system, and FIG. 5 shows the schematic view of the coupling of the plugs of the feeding cables with the taps of the UPS unit, wherein the excess cables are gathered and located in the inside of the arranging device.

BRIEF DESCRIPTION OF THE DRAWINGS

The figures relate to a UPS continuity unit whose taps 20 are located on the upper surface 21 of an external container 6. Above said upper surface 21 of the external container 6, a means for arranging electric cables may be coupled and tied. The arranging device is substantially constituted of an envelope 1 that comprises a fixing base 2 and a dome 3. Said dome is provided with a top 4 or side 4' opening having a longitudinal or circular extension, which is associated to a slit-like cut 5 which develops from it transversally on said dome 3, then vertically 5' for the whole extension of one of the walls of envelope 1, up to base 2 thereof.

Once plugs 9' of the lower end of the connection cables 7 are inserted in the respective taps 20 located on the upper surface 21 of the UPS external container 6, said cables 7 can be pushed within grooves 5–5', and stacked in the inside of envelope 1, until only their upper end parts comprising plugs 9 protrude from the upper 4 or side 4' opening. The protruding upper parts of the cables are limited to lengths sufficient to allow the coupling of the related plugs 9 to the corresponding taps 10 of the various components 8 of the computer operating systems. In order to reduce as much as possible the extension of cables 7 protruding from opening 4 or 4' of envelopes 1, the UPS continuity devices 6 that support them, are positioned as close as possible to the rear edge of desk 11, whereon the computer operating systems are positioned. In this way, all the cables 7 are realized in a simple and rational manner, excluding the possibility of the presence of loose cables. If the distance between the outlet of the arranging device 1 and the various taps 10 for plugs 9 should be abundant, the protruding extensions of cables 7 can be easily gathered within tubular elements 23, or spiral-shaped elements or elements having a longitudinal insertion cut.

The arranging device may have any parallelepipedal, cylindrical or prismatic shape, the upper part having the shape of a semicircular, hemispheric, truncated conical dome or any other shape, provided the whole is an envelope capable of containing the coils or the intermediate spirals of the excess lengths of cables 7, that can be introduced therein through slits 5, 5'.

Base 2 of envelopes 1 may be provided with peripheral holes 12, for fastening by means of screws the continuity devices to the upper part of container 6. Alternatively, the aforesaid coupling may be obtained by means of elastic rims 2' that snap-fit along the perimetric edge 22 of the upper surface 21 of the UPS external container 6, or also by means of glues, pressure sensitive adhesives, or the like.

The arranging device 1 may be realized with metal sheet or also plastic materials in general.

Although the present invention has been described and illustrated in conjunction with specific embodiments offered for illustrative purpose only, it is evident that many alternatives and variations will be apparent to those skilled in the art in the light of the foregoing description.

Accordingly, the invention is intended to encompass all of the alternative and variations that fall within the spirit and scope of the appended claims.

What is claimed is:

1. A continuity device for a plurality of electric feeding cables comprising:

a container (6) having an upper surface (21) provided with current taps (20) located on said upper surface (21); and an arranging device (1) for gathering and containing excess lengths of the electric feeding cables (7) positioned and maintaining them above said upper surface (21), said electric feeding cables (7) being provided at a free end with plugs (9') that can be inserted in said current taps (20), characterized in that the arranging device (1) comprises an envelope (1) that includes a bearing base (2) coupled with, and secured to the upper surface (21) of container (6) above the current taps (20) and side walls extending to a dome (3) provided at the end opposite the base with an upper opening (4,4') having an upper slit-like opening (5) communicating with a second slit (5') extending, vertically along one of the side walls of envelope (1) to and through the bearing base (2).

2. The continuity device for electric cables according to claim 1 characterized in that the upper opening (4') is located along a side surface of said dome (3).

3. The continuity device for electric cables according to claim 2, characterized in that the upper opening (4, 4') has an elongated or circular shape.

4. The continuity device for electric cables according to claim 1, characterized in that the upper opening (4, 4') has an elongated or circular shape.

5. The continuity device for electric cables according to claim 1, characterized in that said envelope (1) of the arranging device is sized to gather and contain in its interior coils or intermediate spirals of the excess lengths of the feeding cables (7) introduced through the slit-like cut (5, 5') that connect said container (6) to operating units (8), whereby the residual parts of cables (7) protruding from the upper opening (4, 4') corresponding only to the end lengths including connection plugs (9) sufficient for their coupling with related taps (10).

6. The continuity device for electric cables according to claim 1, characterized in that said envelope (1) of the arranging device is made from sheet metal or plastic material.

7. The continuity device for electric cables according to claim 1, characterized in that said envelope (1) of the arranging device has a lower portion having a shape selected from the group consisting of parallelepipedal, cylindrical and prismatic shapes, and an upper portion having a shape selected from semicircular hemispheric and truncated pyramidal dome shapes.

8. The continuity device for electric cables according to claim 1, characterized in that the bearing base (2) is provided with through-holes for threaded fasteners.

9. The continuity device for electric cables according to claim 1, characterized in that the bearing base (2) is provided with an elastic rim (2') and the upper surface (21) of said container (6) is provided with a perimetric edge (22), wherein said elastic rim (2') is snap-fitted into said perimetric edge (22).

10. The continuity device for electric cables according to claim 1, characterized in that the bearing base (2) is provided with tying adhesive means.

* * * * *